(12) United States Patent
Shin et al.

(10) Patent No.: US 11,080,323 B2
(45) Date of Patent: Aug. 3, 2021

(54) SEARCH METHOD AND APPARATUS

(71) Applicants: KAKAO CORP., Jeju-si (KR); Kakao Enterprise Corp, Seongnam-si (KR)

(72) Inventors: Myeong Cheol Shin, Jeju-si (KR); Yo Han Ra, Seongnam-si (KR); Jong In Lee, Seongnam-si (KR)

(73) Assignees: KAKAO ENTERPRISE CORP, Gyeonggi-Do (KR); KAKAO CORP., Jeju-si (KR)

( * ) Notice: Subject to any disclaimer, the term of this patent is extended or adjusted under 35 U.S.C. 154(b) by 373 days.

(21) Appl. No.: 15/696,324

(22) Filed: Sep. 6, 2017

(65) Prior Publication Data
US 2018/0067940 A1    Mar. 8, 2018

(30) Foreign Application Priority Data
Sep. 6, 2016   (KR) .................. 10-2016-0114655

(51) Int. Cl.
*G06F 16/48*    (2019.01)
*G06F 16/44*    (2019.01)
*G06F 16/9038*  (2019.01)
*G06F 16/903*   (2019.01)
*G06F 16/332*   (2019.01)
(Continued)

(52) U.S. Cl.
CPC ............ *G06F 16/48* (2019.01); *G06F 16/332* (2019.01); *G06F 16/3322* (2019.01); *G06F 16/3325* (2019.01); *G06F 16/3326* (2019.01); *G06F 16/3338* (2019.01); *G06F 16/438* (2019.01); *G06F 16/44* (2019.01); *G06F 16/9038* (2019.01); *G06F 16/90335* (2019.01); *G06F 16/9032* (2019.01); *G06F 16/90324* (2019.01); *G06F 16/95* (2019.01); *G06F 16/9532* (2019.01); *G06F 16/9538* (2019.01)

(58) Field of Classification Search
CPC .... G06F 16/48; G06F 16/90335; G06F 16/44; G06F 16/9038; G06F 16/951; G06F 16/3322; G06F 16/90324; G06F 16/3344; G06F 16/3338; G06F 16/40; G06F 16/43; G06F 16/33; G06F 16/332; G06F 16/3325; G06F 16/3326; G06F 16/3328; G06F 16/34; G06F 16/358; G06F 16/438; G06F 16/903; G06F 16/9035; G06F 16/9032; G06F 16/90328; G06F 16/95; G06F 16/953; G06F 16/9535; G06F 16/9532; G06F 16/9538; G06F 16/954
See application file for complete search history.

(56) References Cited

U.S. PATENT DOCUMENTS 8,417,718 B1 *  4/2013  Finkelstein ......... G06F 16/3322
                                                   707/767
9,047,278 B1 *  6/2015  Mann ................. G06F 16/24578
(Continued)

FOREIGN PATENT DOCUMENTS

KR    1020100075545 A     7/2010
KR    1020130125999 A    11/2013
(Continued)

Primary Examiner — David T. Brooks
(74) Attorney, Agent, or Firm — Cantor Colburn LLP

(57) ABSTRACT

Disclosed is a search method and apparatus. A search service generates extend keywords highly related to a query input by a user, and provides a search result optimized to each extend keyword.

16 Claims, 17 Drawing Sheets

(51) Int. Cl.
*G06F 16/438* (2019.01)
*G06F 16/33* (2019.01)
*G06F 16/9032* (2019.01)
*G06F 16/95* (2019.01)
*G06F 16/9532* (2019.01)
*G06F 16/9538* (2019.01)

(56) References Cited

U.S. PATENT DOCUMENTS

| | | | | |
|---|---|---|---|---|
| 9,589,032 | B1* | 3/2017 | Brinck | G06F 16/248 |
| 2002/0194162 | A1* | 12/2002 | Rios | G06F 16/951 |
| 2003/0217052 | A1* | 11/2003 | Rubenczyk | G06F 16/3323 |
| 2006/0184512 | A1* | 8/2006 | Kohanim | G06F 16/9038 |
| 2007/0162442 | A1* | 7/2007 | Brill | G06F 16/3322 |
| 2007/0192293 | A1* | 8/2007 | Swen | G06F 16/338 |
| 2008/0208841 | A1* | 8/2008 | Zeng | G06F 16/3338 |
| 2009/0043749 | A1* | 2/2009 | Garg | G06F 16/3338 |
| 2009/0077037 | A1* | 3/2009 | Wu | G06F 16/90324 |
| 2009/0094234 | A1* | 4/2009 | Marvit | G06F 16/951 |
| 2009/0204609 | A1* | 8/2009 | Labrou | G06F 16/3322 |
| 2009/0234832 | A1* | 9/2009 | Gao | G06F 16/3322 |
| 2010/0082604 | A1* | 4/2010 | Gutt | G06F 16/3326 707/721 |
| 2010/0088647 | A1* | 4/2010 | Jing | G06F 3/0482 715/838 |
| 2010/0114876 | A1* | 5/2010 | Mandel | G06Q 10/10 707/722 |
| 2010/0198837 | A1* | 8/2010 | Wu | G06F 16/248 707/748 |
| 2010/0228742 | A1* | 9/2010 | Vandelle | G06Q 30/02 707/750 |
| 2011/0078127 | A1* | 3/2011 | Lin | H04L 67/42 707/706 |
| 2011/0264683 | A1* | 10/2011 | Kang | G06F 16/907 707/769 |
| 2011/0314006 | A1* | 12/2011 | Sweeney | G06F 17/2785 707/723 |
| 2012/0047134 | A1* | 2/2012 | Hansson | G06Q 30/0275 707/731 |
| 2012/0259827 | A1* | 10/2012 | Greene | G06F 16/168 707/706 |
| 2012/0265784 | A1* | 10/2012 | Hsu | G06F 16/3322 707/771 |
| 2012/0290575 | A1* | 11/2012 | Hu | G06F 16/3325 707/737 |
| 2013/0013580 | A1* | 1/2013 | Geller | G06F 16/951 707/706 |
| 2013/0103680 | A1* | 4/2013 | Arrasvuori | G06F 16/14 707/728 |
| 2013/0124555 | A1* | 5/2013 | Duquene | G06F 16/904 707/769 |
| 2013/0218899 | A1* | 8/2013 | Raghavan | G06F 16/3328 707/741 |
| 2013/0282749 | A1* | 10/2013 | Batraski | G06F 16/90328 707/767 |
| 2014/0280289 | A1* | 9/2014 | Marantz | G06F 16/951 707/767 |
| 2014/0344264 | A1* | 11/2014 | Kenna | G06F 16/90328 707/731 |
| 2015/0006520 | A1* | 1/2015 | Ormont | G06F 16/248 707/723 |
| 2015/0066902 | A1* | 3/2015 | Kim | G06F 16/248 707/722 |
| 2015/0213094 | A1* | 7/2015 | Lou | G06F 16/338 707/722 |
| 2016/0306898 | A1* | 10/2016 | Yoo | G06F 16/90328 |
| 2017/0132323 | A1* | 5/2017 | Kuralenok | G06F 16/248 |
| 2017/0147834 | A1* | 5/2017 | Bendersky | G06F 16/24578 |
| 2017/0220680 | A1* | 8/2017 | Shattuck | G06F 16/951 |
| 2017/0242913 | A1* | 8/2017 | Tijssen | G06F 17/2775 |
| 2017/0300560 | A1* | 10/2017 | Nugent | G06F 3/04842 |

FOREIGN PATENT DOCUMENTS

| | | |
|---|---|---|
| KR | 1020130138872 A | 12/2013 |
| KR | 1020140075428 A | 6/2014 |
| KR | 1020160026907 A | 3/2016 |

* cited by examiner

SEARCH METHOD AND APPARATUS

CROSS-REFERENCE TO RELATED APPLICATION(S)

This application claims the priority benefit of Korean Patent Application No. 10-2016-0114655 filed on Sep. 6, 2016, in the Korean Intellectual Property Office, the disclosure of which is incorporated herein by reference for all purposes.

BACKGROUND

1. Field

One or more example embodiments relate to a search method and apparatus.

2. Description of Related Art

Search services such as a related keyword, a suggest, and a real-time search word are provided based on a degree of relation of a search keyword or an issue. However, since the search keyword is not connected to search results, a search quality is not guaranteed. Thus, a user may experience inconvenience of performing a number of searches while changing a query until desired information is found.

SUMMARY

According to an aspect, there is provided a search method including receiving a search query, setting the search query as an object, generating at least one extend query by adding at least one property related to the object to the object, generating at least one search result including the at least one extend query as a search word, and providing the at least one search result for each of the at least one extend query based on a ranking of the at least one extend query.

The generating of the at least one extend query may include obtaining frequencies of properties corresponding to the object from at least one of a query log and a click log, arranging extend query candidates corresponding to the properties for each ranking by assigning weights corresponding to predefined periods to the frequencies, and generating the at least one extend query from the arranged extend query candidates.

The arranging may include assigning a penalty to at least one of the properties based on rankings of the frequencies of the properties in one of the periods.

The arranging may include extracting a keyword related to the object based on at least one of a real-time popular search word and real-time news information related to the object, and assigning a weight to a property that matches the extracted keyword.

The generating of the at least one extend query may further include generating at least one second extend query using at least one of a suggest function and a related keyword function, and arranging the at least one second extend query at a lower ranking than the extend query candidates.

The generating of the at least one extend query may include generating the at least one extend query using at least one of a suggest function and a related keyword function when a property corresponding to the object is absent.

The search method may further include arranging the at least one extend query in a vertical scroll direction and outputting the at least one extend query for each ranking, and arranging and outputting a search result for each of the at least one extend query in a horizontal scroll direction with respect to the corresponding extend query.

The generating of the at least one search result may include removing at least one remaining search result, except for a search result corresponding to a top-ranking extend query, from the same search results corresponding to extend queries at different rankings among the at least one extend query.

The search method may further include outputting the at least one search result using at least one card corresponding to a predetermined template, and the template may be defined based on a category of content corresponding to the at least one search result.

The search method may further include, in response to sharing of the at least one card using an application, visualizing the at least one card to be identical to the template and sharing the at least one card with a counterpart of the sharing.

The generating of the at least one extend query may include determining one of categories of properties corresponding to the object based on a search history of a user, and generating at least one extend query belonging to the determined category.

The generating of the at least one search result may include classifying search results including the at least one extend query as a search word in a unit of collection which is a criterion for classifying content, and generating at least one search result classified in the unit of collection, and the collection may include at least one of news, an image, an integrated web, and a video.

The generating of the at least one extend query may include obtaining at least one extend query corresponding to the object from at least one of an object-property list in which extend keywords generated by combining the object with the at least one property are listed for each ranking, and a keyword graph which is a topology that defines relations between keywords based on connecting strengths.

The search method may further include generating the object-property list, and the generating of the object-property list may include extracting object candidates from at least one of a query log and a click log based on suffix patterns, separating an object and properties by applying at least one of a morpheme analyzing scheme and a pattern matching scheme to the object candidates, generating extend keywords based on the separated object and the separated properties, and arranging the generated extend keywords by assigning weights to frequencies of the separated properties obtained from the query log.

The search method may further include generating the keyword graph, and the generating of the keyword graph may include obtaining a content graph which is a topology that defines relations between an object and content, generating relations between keywords by combining extend keywords generated from a query log and a click log with the content graph, and assigning connecting strengths of the relations based on the query log, the click log, and the extend keywords.

The search method may further include searching the keyword graph for a keyword corresponding to the object and content of the properties, and searching for the content using a reference link from the keyword graph to a content graph.

According to another aspect, there is also provided a method of providing a search user interface (UI), the method including transmitting a search query input by a user to a server, receiving, from the server, at least one extend query generated based on the search query and at least one search result including the at least one extend query as a search word, and providing a UI displaying the at least one search result for each of the at least one extend query based on a ranking of the at least one extend query. The search query may be set as an object, and the at least one extend query may be generated by adding at least one property related to the object to the object.

The method may further include providing a UI displaying the at least one search result using at least one card corresponding to a predetermined template.

The method may further include transmitting, to the server, sharing of the at least one card input from the user, and the at least one card may be visualized by the server to be identical to the template and shared with a counterpart of the sharing.

The method may further include providing a UI arranging the at least one extend query in a vertical scroll direction and displaying the at least one extend query for each ranking, and providing a UI arranging and displaying a search result for each of the at least one extend query in a horizontal scroll direction with respect to the corresponding extend query.

According to still another aspect, there is also provided a search apparatus including a processor configured to receive a search query, set the search query as an object, generate at least one extend query by adding at least one property related to the object to the object, generate at least one search result including the at least one extend query as a search word, and provide the at least one search result for each of the at least one extend query based on a ranking of the at least one extend query.

The search apparatus may further include a memory configured to store at least one of an object-property list in which extend keywords generated by combining the object with the at least one property are listed for each ranking, and a keyword graph which is a topology that defines relations between keywords based on connecting strengths, and the processor may be configured to obtain at least one extend query corresponding to the object from at least one of the object-property list and the keyword graph.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
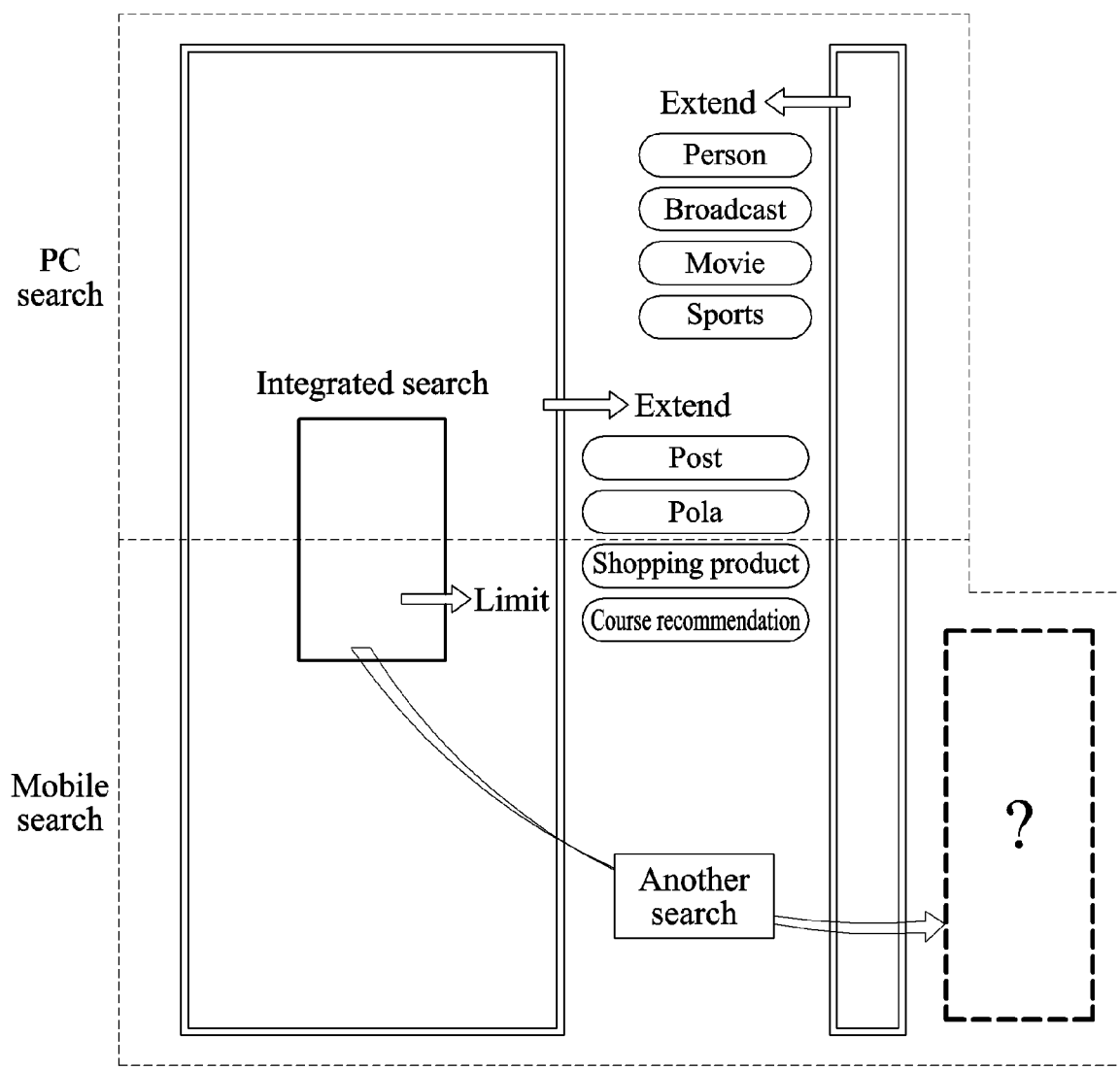
FIG. 1 is a diagram illustrating a background of the development of a search service according to an example embodiment.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein. Hereinafter, reference will now be made in detail to the example embodiments, examples of which are illustrated in the accompanying drawings, wherein like reference numerals refer to the like elements throughout.

FIG. 1 is a diagram illustrating a background of the development of a search service according to an example embodiment. Referring to FIG. 1, a search service according to an example embodiment, hereinafter, the "search service", was developed to overcome a limit of existing search services such as an integrated search or other web searches provided using a personal computer (PC) or a mobile device. The search service may provide a search service differentiated from the existing search services.

In detail, the search service relates to an extend query search. The search service may generate an extend keyword with a high degree of relation with a query input by a user, and provide an optimized search result for each extend keyword. When the extend keyword and the search result are provided together based on the input query, the user may easily find desired information without performing an additional search. The search service may provide a technology to resolve an inconvenience of performing an additional search, thereby improving user satisfaction.

Figure 2:
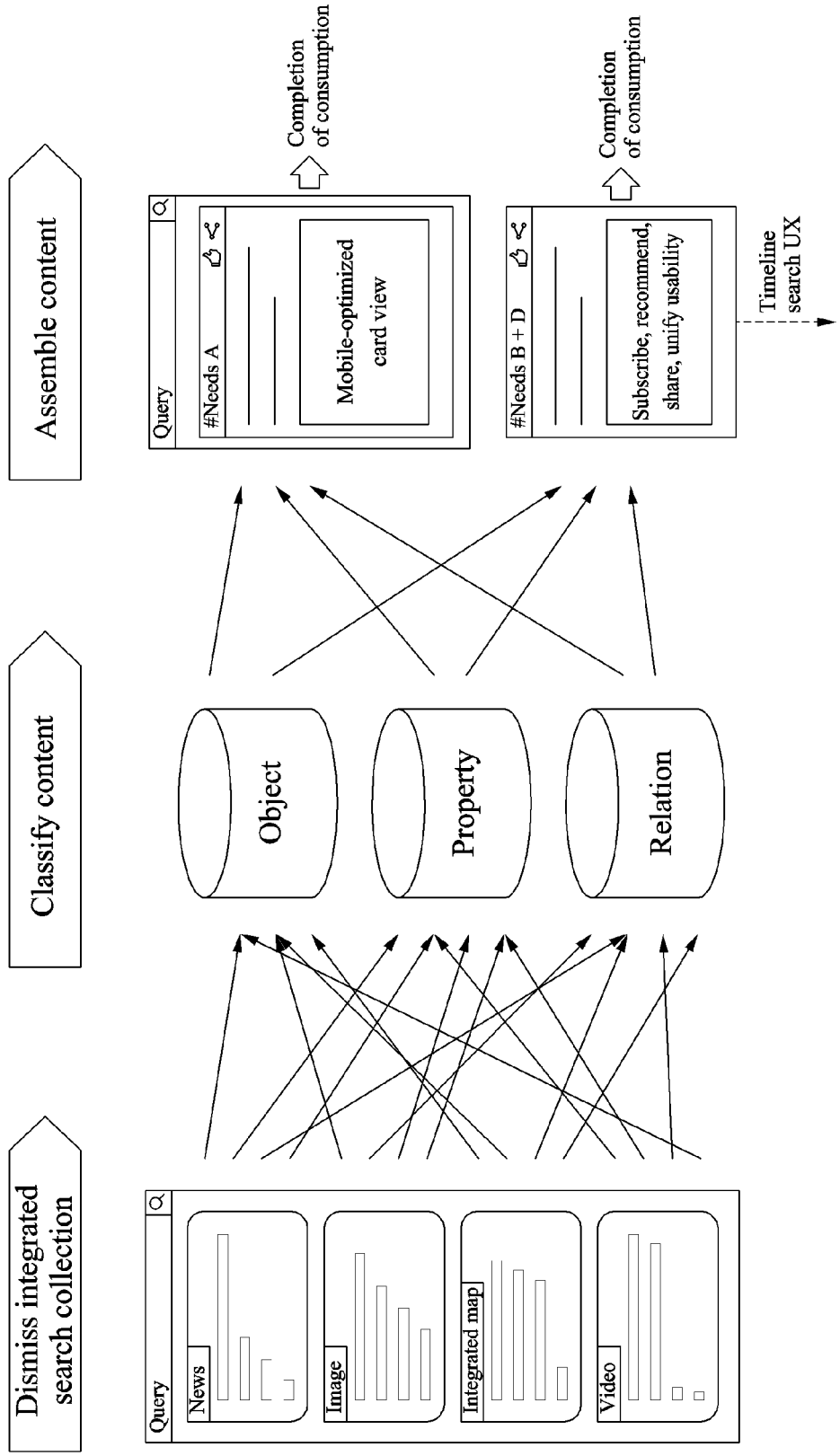
FIG. 2 is a diagram illustrating an operation of classifying and assembling content in a search service according to an example embodiment.

FIG. 2 is a diagram illustrating an operation of classifying and assembling content in a search service according to an example embodiment. Referring to FIG. 2, the search service may dismiss a collection generated by an existing integrated search. The collection is a criterion on which content is classified by the exiting integrated search, and may include, for example, news, an image, an integrated web, and a video.

The search service may dismiss the collection, and classify the content based on an object and a property. In an example, the content may further be classified based on a relation.

The search service may assemble the content based on needs of the user using the object and the property. The content assembled by the search service may be provided to the user through a timeline search interface.

Figure 3:
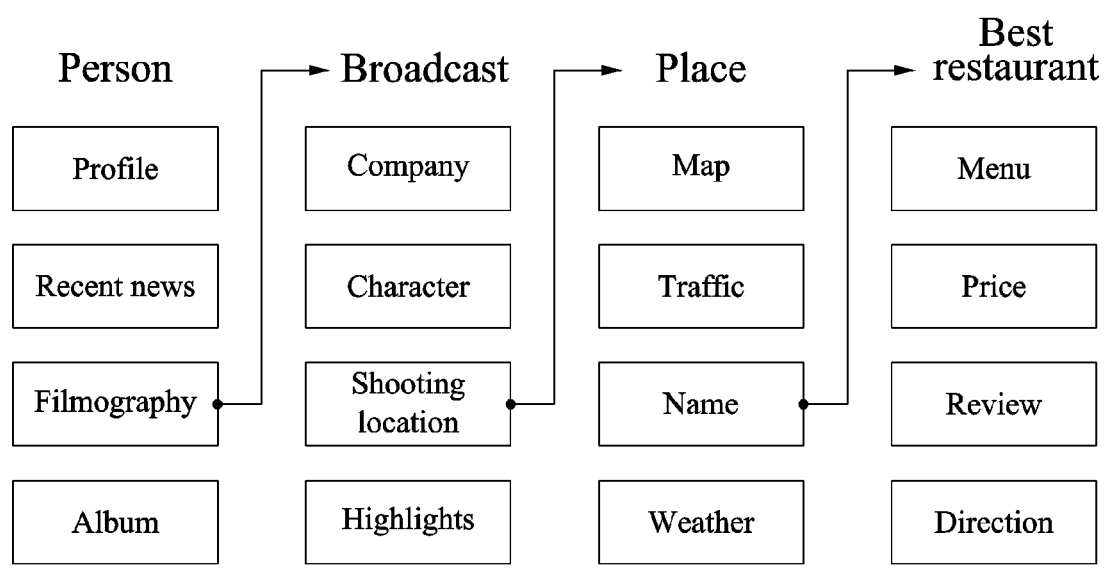
FIG. 3 is a diagram illustrating an operation of connecting content in a search service according to an example embodiment.

FIG. 3 is a diagram illustrating an operation of connecting content in a search service according to an example embodiment. Referring to FIG. 3, in a case in which an initial search word relates to a predetermined person, the search service may provide content related to a profile, recent news, filmography, and albums of the corresponding person as search results. Here, the predetermined person may be an object, and the profile, the recent news, the filmography, and the albums of the corresponding person may be properties corresponding to the object.

When the user selects a work from the filmography of the corresponding person, the search service may provide an agency, a character, a shooting location, and highlights related to the selected work as search results. Further, when the user selects the shooting location, the search service may provide a map, traffic information, a name, and weather related to the selected shooting location as search results. When the user selects the name, the search service may provide a menu, prices, reviews, and a direction related to the selected name as search results.

As described above, the search service may provide a service that starts from a search word related to a first object, for example, a person, and naturally leads to search results related to a second object, for example, a best restaurant.

Figure 4:
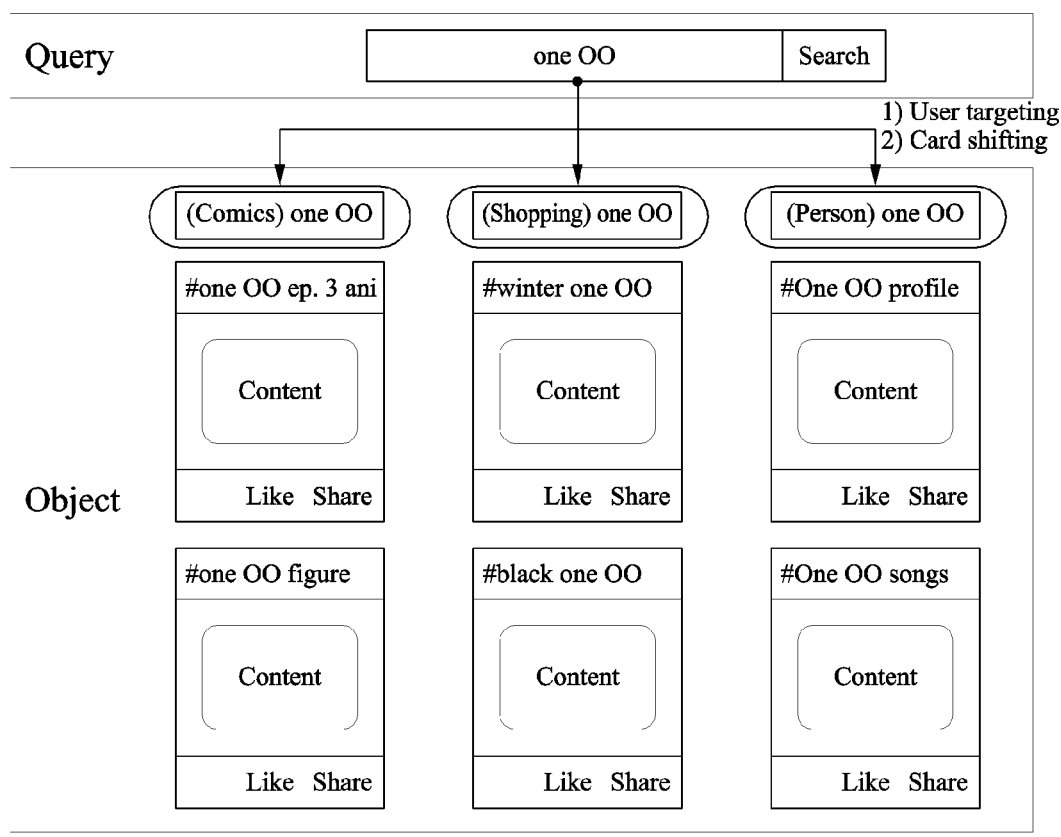
FIG. 4 is a diagram illustrating an operation of understanding a context of content in a search service according to an example embodiment.

FIG. 4 is a diagram illustrating an operation of understanding a context of content in a search service according to an example embodiment. In an example, the search service may provide all users with the same extend query search result when the users input the same query. In another example, the search service may provide each user with a different extend query search result by analyzing an interest and a use pattern of each user group.

Referring to FIG. 4, a user may input a query "one OO". The search service may set the input query "one OO as an object, and generate extend queries using various properties corresponding to the object.

In this example, different properties may be determined for each category with respect to the same object. For example, in a comics category, properties such as "ep. 3 ani" and "figure" may be determined. In a shopping category, properties such as "winter" and "black" may be determined. In a person category, properties such as "profile" and "songs" may be determined.

The search service may perform user targeting and shift cards to be provided as search results. For example, the search service may determine that a context of the input query "one OO" corresponds to the shopping category based on a past search history of the user. In this example, the search service may provide the user with properties corresponding to the shopping category among various properties corresponding to the object of "one OO".

As will be described below, the search service may determine scores of the properties corresponding to the object, and determine relatively high scores of properties determined to correspond to a context intended by the user. The search service may display, with priority, search results for extend queries generated based on properties having relatively high scores. Further, the search service may arrange the extend queries in an order of the scores, select a predetermined number of extend queries, and provide search results for the selected extend queries.

Figure 5:
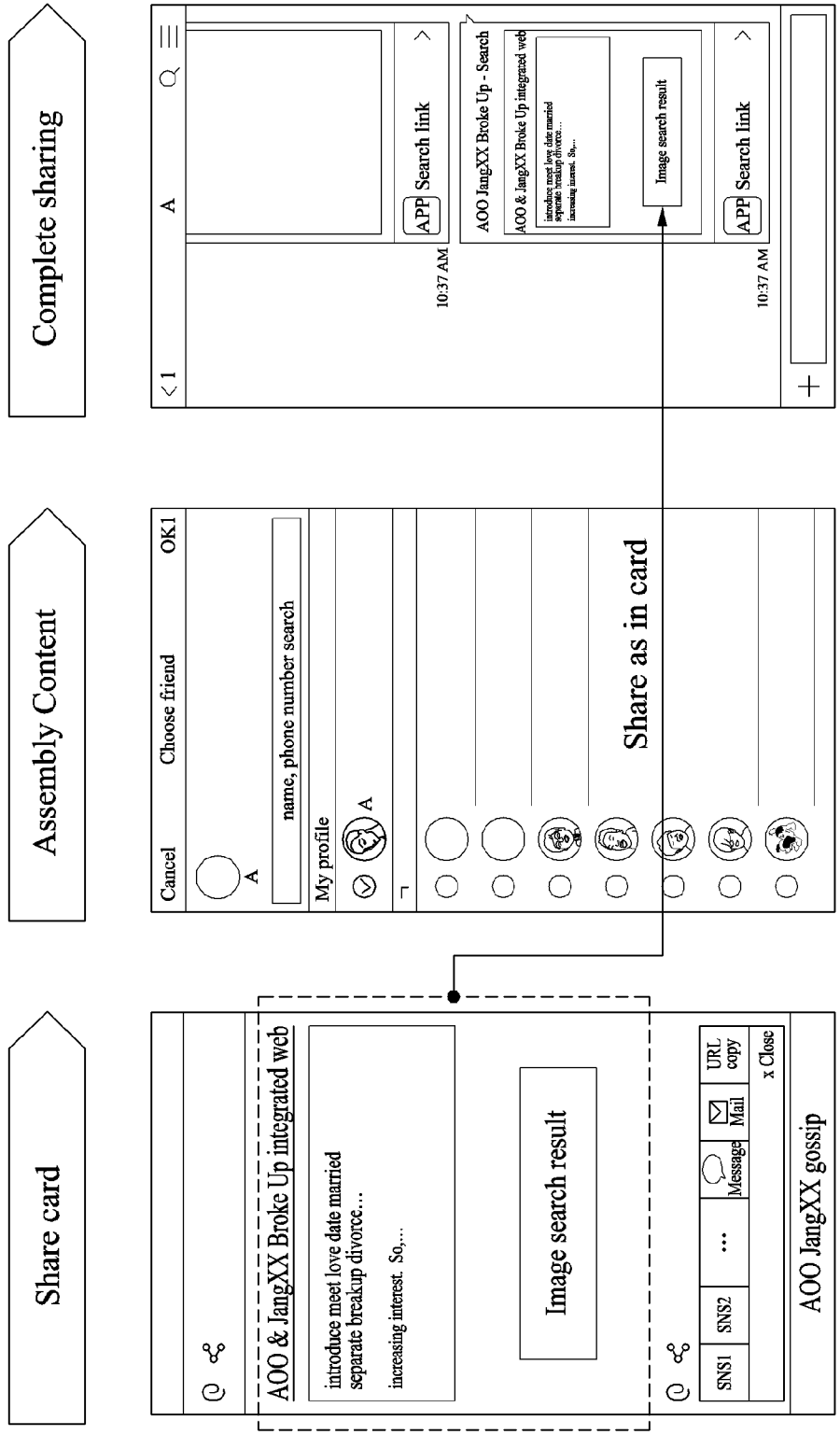
FIG. 5 is a diagram illustrating an operation of sharing a card provided to a user as a search result in a search service according to an example embodiment.

FIG. 5 is a diagram illustrating an operation of sharing a card provided to a user as a search result in a search service according to an example embodiment. Referring to FIG. 5, the search service may provide a search result in a form of a card. The card may be a predetermined template, and a different template may be used based on a category of content corresponding to the search result.

The search service may provide a function to share the search result with a social network service (SNS) or an instant message service. For example, in a case in which a search query is "AOO JangXX", the search service may set "AOO JangXX" as an object, and generate extend queries using a plurality of properties, for example, "broke up", "integrated web", and "gossip", corresponding to the object.

When the user provides an input to share a card corresponding to a search result for at least one of the extend queries, for example, "AOO JangXX broke up integrated web", with a mobile instant message application, the search service may share the corresponding card in the same form displayed to the user who wants the sharing. For example, the search service may capture the card displayed to the user who wants the sharing, and provide the captured card to the application which is a target of the sharing. In this example, the mobile instant message application may display the captured card in a chatroom, and provide a link to access a corresponding web page.

In an example, the search service may be implemented using an additional function, for example, a channel function, of the mobile instant message application.

Figure 6:
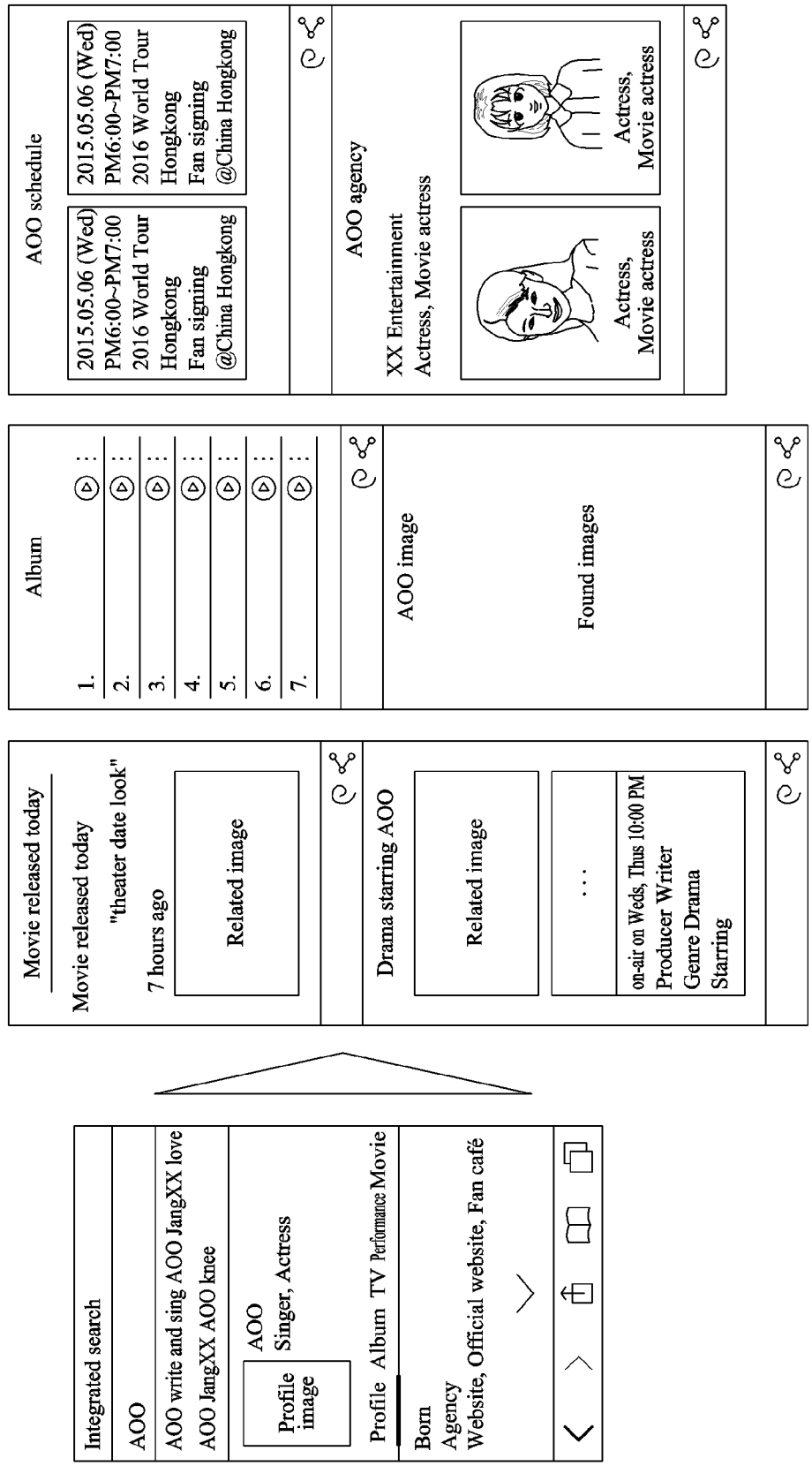
FIG. 6 is a diagram illustrating a search result provided through a search service according to an example embodiment.

FIG. 6 is a diagram illustrating a search result provided through a search service according to an example embodiment. Referring to FIG. 6, a predetermined person may be input as a query. In this example, unlike an existing integrated search that provides a search result for each collection, the search service may generate extend queries using various properties, for example, "movie released today", "drama starring the person", "album", "image", "schedule", and "agency", corresponding to the input query set as an object, and provide a search result for each of the extend queries. Although not shown in the drawings, the search service may display a search result for the input query, and then display the search results for the extend queries.

Although not shown in the drawings, predetermined broadcast content may be input as a query. In a case in which the input broadcast content is a drama, extend queries may be generated by determining "plot summary including video" and "fashion" to be properties corresponding to the broadcast content set as an object. In a case in which the input broadcast content is a broadcast related to food, extend queries may be generated by determining "fried pork with sweet and sour sauce shooting location" and "ep. 22 fishcake dish recipe" to be properties corresponding to the broadcast content set as an object.

In a case in which movie content is input as a query, extend queries may be generated by determining "big movies to be released in May", "cast", "preview apply", "theater appearance schedule", and "nearby theater" to be properties corresponding to the movie content set as an object. In a case in which a sports player is input as a query, extend queries may be generated by determining "highlights", "match schedule", "live count", "club information", "club SNS", and "club current response" to be properties corresponding to the sports player set as an object. In a case in which weather is input as a query, extend queries may be generated by determining "Busan Suyounggu Gwangandong weather", "Gwangandong weekly weather", and "rainy day music" to be properties corresponding to the weather set as an object. In a case in which company information is input as a query, extend queries may be generated by determining "stock price", "foreign/institution", "company information", "brokerage firm consensus", "investment information", and "item announcement" to be properties corresponding to the company information set as an object.

Example embodiments are not limited to the operations mentioned above, and may also provide the search service with respect to various other search words.

Figure 7:
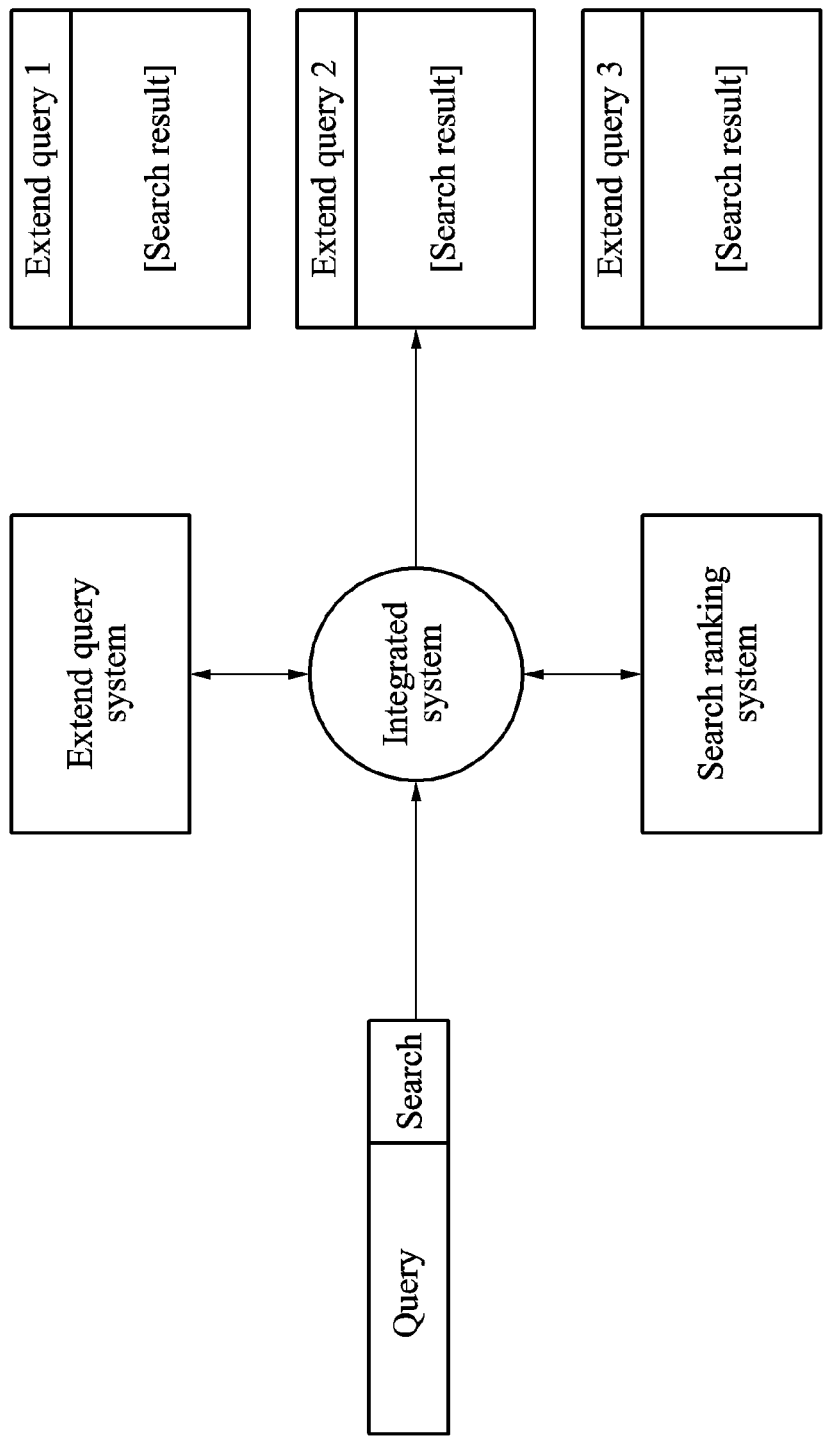
FIG. 7 is a diagram illustrating a system structure for a search service according to an example embodiment.

FIG. 7 is a diagram illustrating a system structure for a search service according to an example embodiment. Referring to FIG. 7, the search service may be implemented using an extend query system, a search ranking system, and an integrated system for an extend query search. The extend query system may generate an extend query based on a query input by a user. The search ranking system may determine a search result ranking suitable for each extend query. The integrated system may integrate the extend query system and the search ranking system.

The extend query system may set the input query as an object, and generate extend queries by determining properties corresponding to the object. In a case in which it is impossible to determine properties corresponding to the object, the extend query system may generate extend queries using a suggest function and/or a related keyword function. In this example, the search ranking system may determine scores of the extend queries generated through the suggest function and/or the related keyword function to be lower than scores of the extend queries generated based on the properties corresponding to the object.

In detail, the extend query system may set an input search query as an object, and generate extend queries by adding properties related to the object to the object. In this example, a query log may be used to generate the extend queries. For example, extend query candidates may be arranged by assigning weights corresponding to periods, for example, a day, a week, a month, and a year, to frequencies of the properties corresponding to the object. In addition, a further adjustment of increasing a score of a property appearing in real-time news information may also be performed. A predetermined number of extend queries may be determined based on an order of the finally arranged extend query candidates.

An object-property list may be provided in advance using an object list. Here, the object list may be downloaded from a content database (DB) such as a content graph, or may be deduced from the query log. In an example, the extend query system may also be implemented using a general keyword graph, instead of the object-property list. The implementation scheme using the keyword graph will be described later.

Meanwhile, in a case in which a property corresponding to the search query set as the object is absent, for example, in a case in which the search query is relatively long, a suggest function and a related keyword function may be utilized to generate extend queries.

The integrated system may provide the user with search results in an order of a search result for a search query, a search result for a first extend query, a search result for a second extend query, and the like. For example, in a mobile environment, the search query and the extend queries may be arranged in a vertical scroll direction, and a plurality of search results for each extend query may be arranged in a horizontal scroll direction. In this example, each of the search results for each extend query may be output in a form of a card corresponding to a predetermined template. Rankings of the search results for each extend query may be determined using substantially the same scheme as the existing integrated search.

In an example, the integrated system may output the results found using each extend query separately in a unit of collection. For example, the search results may be output in a form of first extend query (news collection)—first extend query (image collection)—first extend query (blog collection). Substantially the same scheme as the existing integrated search may be used to determine rankings of the collections. In this example, a label with respect to each collection may be displayed along with the extend query.

Figure 8A:
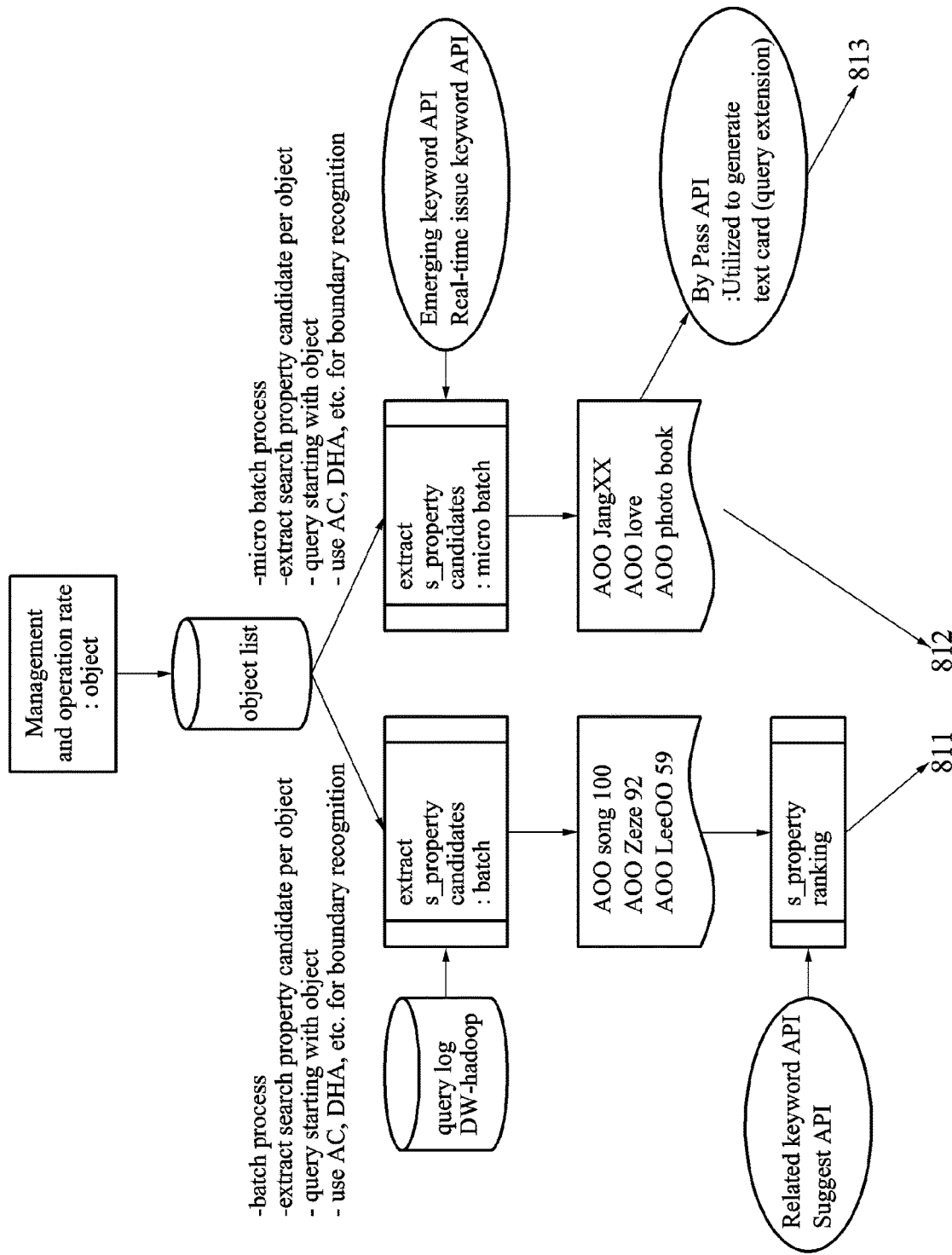
FIGS. 8A and 8B are diagrams illustrating an extend query system according to an example embodiment.
Figure 8B:
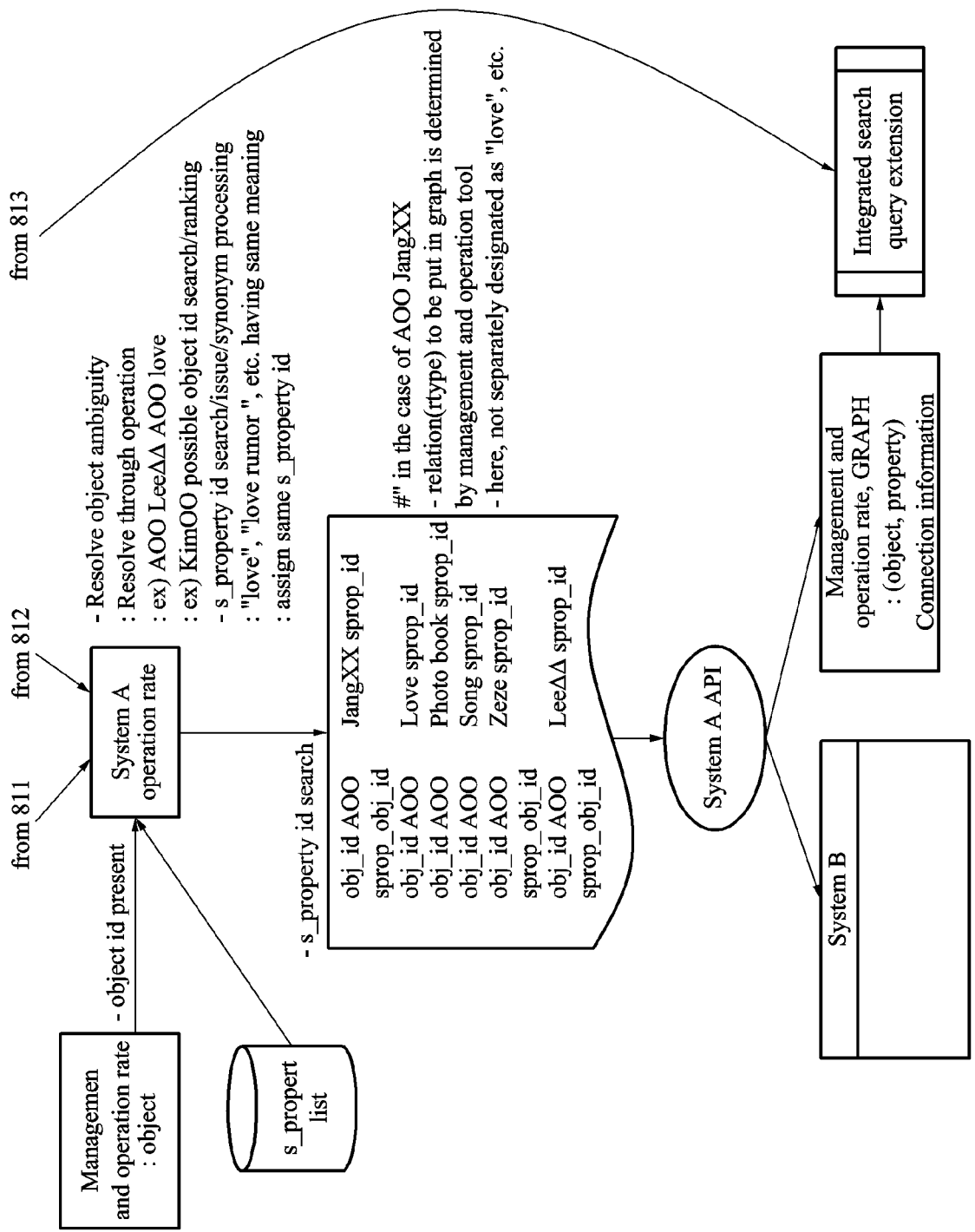

FIGS. 8A and 8B are diagrams illustrating an extend query system according to an example embodiment. Definitions of terms used in FIGS. 8A and 8B are shown in Table 1.

TABLE 1

OQ: Original Query
EQ: Extend Query
EK: Extend Keyword
SG: Suggest
RK: Related Keyword
AK: Admin Keyword Further, query needs used by the extend query system may be defined as shown in Table 2.

TABLE 2

Query-needs for OQ = QN-Score(OQ) = 1.0
Query-needs for EQ = QN-Score(EQ) = α * QN-Score(EK or SG) + (1 − α) * QN-Score(RK)
Basic parameter α = 0.9
Query-needs for EK = QN-Score(EK) = 1.0 * Rank Score(EK)
Query-needs for SG = QN-Score(SG) = RF-Score(SG) * Rank-score(SG)
Query-needs for RK = QN-Score(RK) = RF-Score(RK) * Rank-score(RK)
Rank-score(x) = 10.0 / (10.0 + Rank(x)) reference
Related Term Freq Score = RF-Score(x|OQ) = sum(DF(term)| term in OQ, term in x)

The extend query system may obtain document frequencies (DFs) of terms appearing in an extend query, and use a DF of a term included in the original query. (It may be assumed that a term appearing in the original query and having a number of DFs in the extend query has a high relation.) Referring to an example of Table 3, the extend query system may use a morpheme analyzer, for example, DHA, or an extend query spacing.

TABLE 3 ex> Q: SuO age → DF: SuO(20/25) age(5/25)
SG1: SuO actual age → DF(SuO) * 1.0 + DF(age) * 1.0 → 1.0
SG2: SuO body shape → DF(SuO) * 1.0 + DF(age) * 0.0 → 0.8

Further, a ranking model used by the extend query system may be determined as shown in Table 4.

TABLE 4

Figure 9:
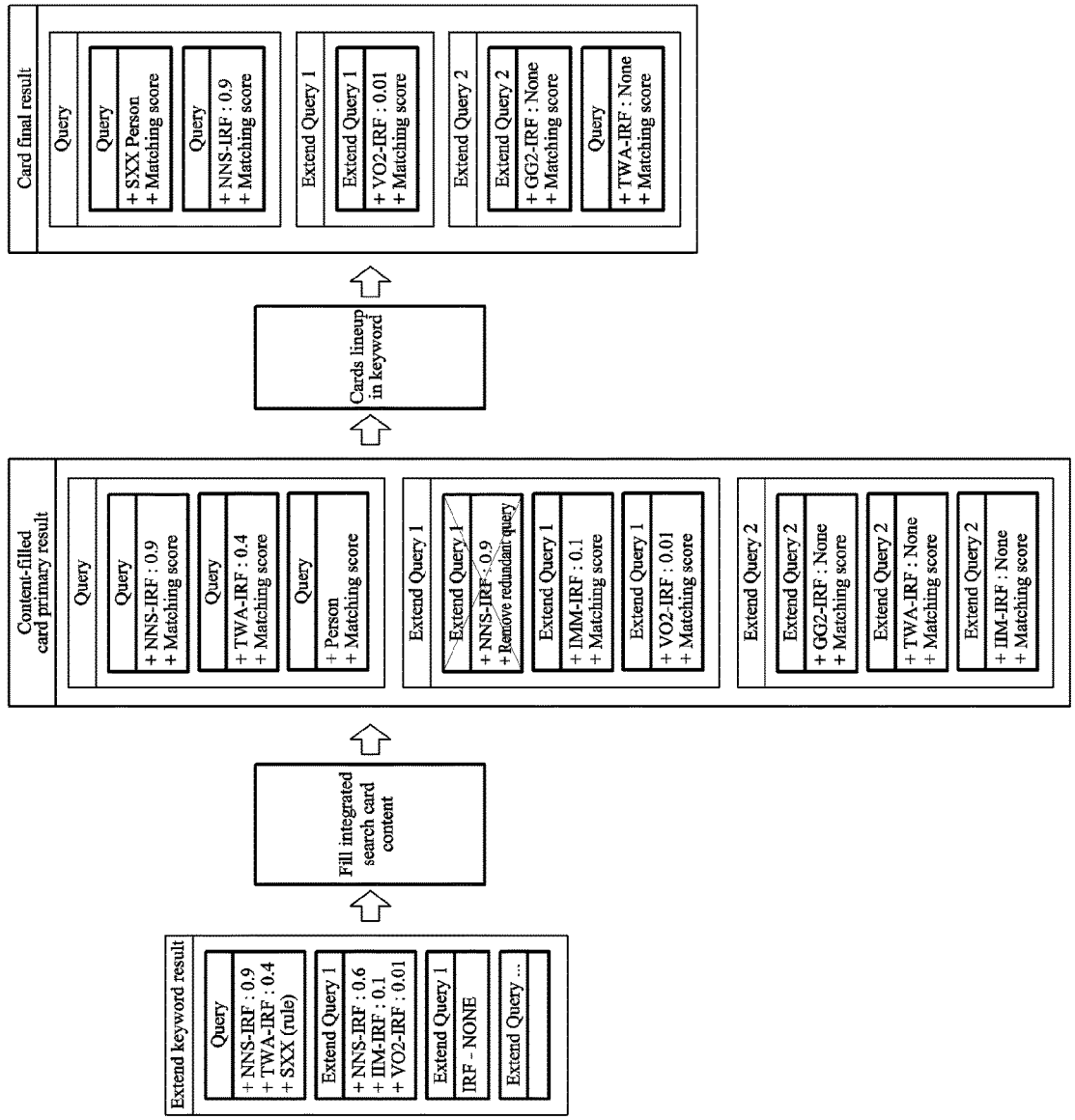
FIG. 9 is a diagram illustrating a search ranking system according to an example embodiment.

Arrange in order of query needs of keyword
After arrangement, reset to corrected rank value of AK
Transfer finally ranked extend keyword list to search ranking system FIG. 9 is a diagram illustrating a search ranking system according to an example embodiment. Referring to FIG. 9, the search ranking system may collect N search results from the existing integrated search system in an order of extend keywords received from the extend query system.

In a case in which the same search results are found for different extend keywords, the search ranking system may retain a first result and remove a remaining redundant search result. The search ranking system may remove a redundant search result in real time, each time the search results are reloaded as the user scrolls down.

The search ranking system may remove a search result having a relatively low ranking score from the search results for each extend keyword, and display only at most M search results per extend keyword.

Figure 10A:
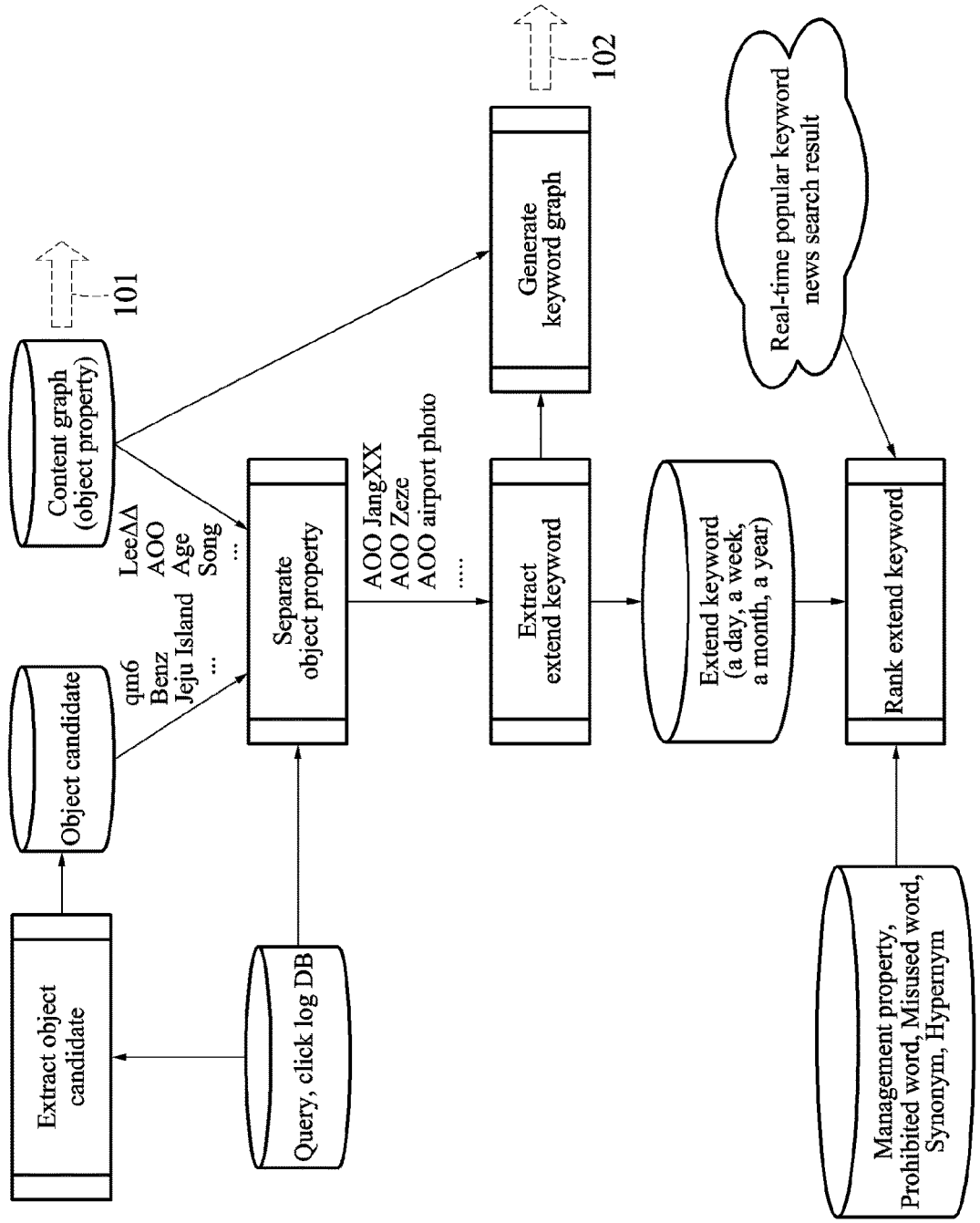
FIGS. 10A and 10B are diagrams illustrating an extend keyword generating system according to an example embodiment.
Figure 10B:
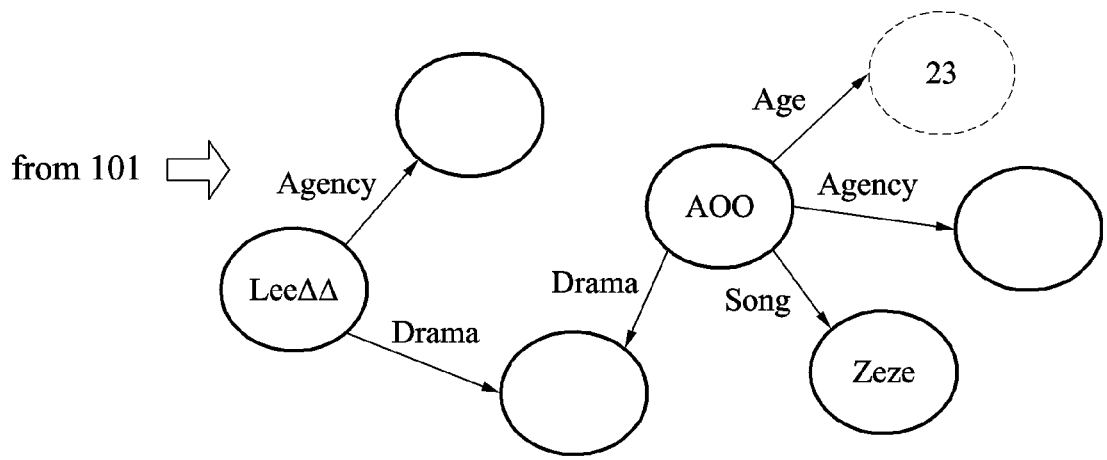
Figure 10B:
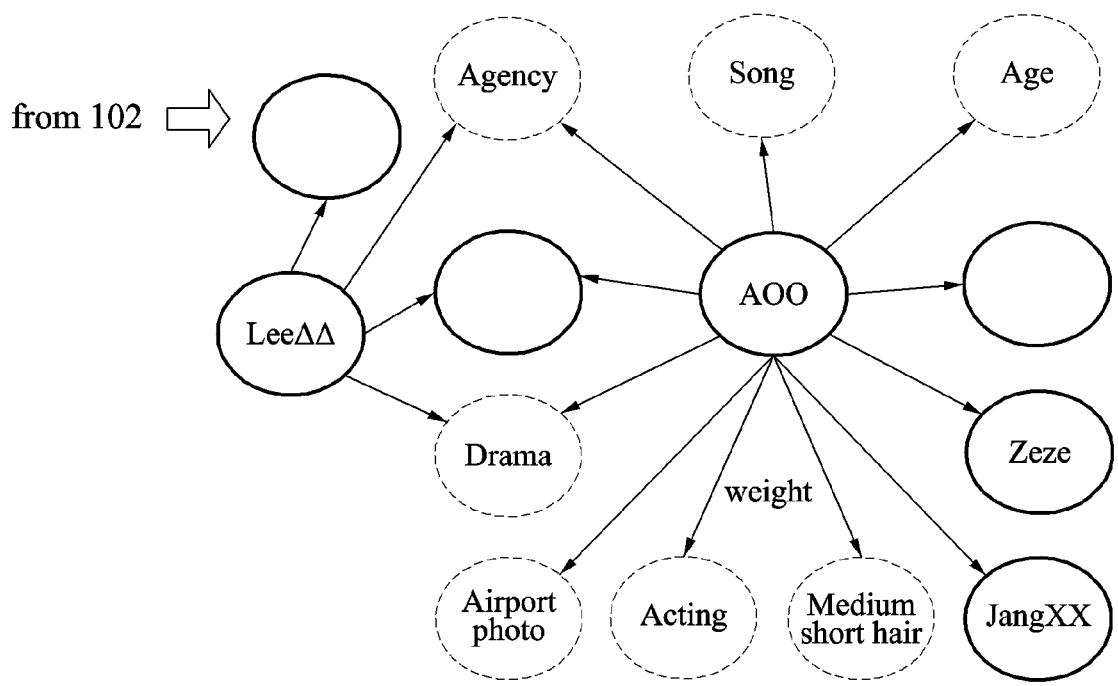

FIGS. 10A and 10B are diagrams illustrating an extend keyword generating system according to an example embodiment. Referring to FIGS. 10A and 10B, the extend keyword generating system may generate an extend keyword through the following operations.

1. Extract object candidate
    A. Extract a keyword having a high probability of being an object from a query log
        i. The more suffix patterns following keyword candidate, the higher probability of being an object
        ii. Utilize search result display collection information
2. Separate object and properties
    A. Separate a query into an object and properties using a morpheme analyzer or a pattern matching scheme
3. Extract extend keyword
    A. Classify a query log by various periods such as a day, a week, a month, and a year, and extract extend keywords for each period
    B. Provide extend keyword extracting results using a list of extend keywords corresponding to the object
        i. ex) "AOO"-"AOO drama", "AOO song", "AOO JangXX", "AOO photo", etc.
        ii. The extend keywords basically have frequency information of the query log.
4. Rank extend keyword
    A. Determine rankings basically based on frequencies of extend keywords
    B. The extend keywords are extracted for various periods, and thus calculate scores in view of weights for the respective sources
        i. ex) 0.5*(frequency for a day)+0.2*(frequency for a week)+0.15*(frequency for a month)+0.15*(frequency for a year)
        ii. Weights for the periods may be learned through matching learning
    C. Assign penalty based on information on a frequency of a predetermined extend keyword in each source
        i. ex) In a case in which "AOO medium short hair" is ranked 40th in a day period, assign a lower score due to the low ranking
    D. In a case in which the object matches or is related to a real-time popular search word, retrieve a news search result using a news search API and extract a related keyword
        i. In a case in which the related keyword matches the extend keyword, assign a weight
        ii. ex) In a case in which "AOO airport photo" is extracted from a news result found for a search word "AOO", assign a weight to a score of the extend keyword "AOO airport photo"
    E. Assign a greater weight to a property being managed
    F. Filter extend keywords using a list of prohibited words and misused words
    G. Group similar extend keywords using synonym and hypernym information In an example, the extend keyword generating system may utilize a keyword graph. In this example, the extend keyword generating system may perform the following operations.

Figure 11:
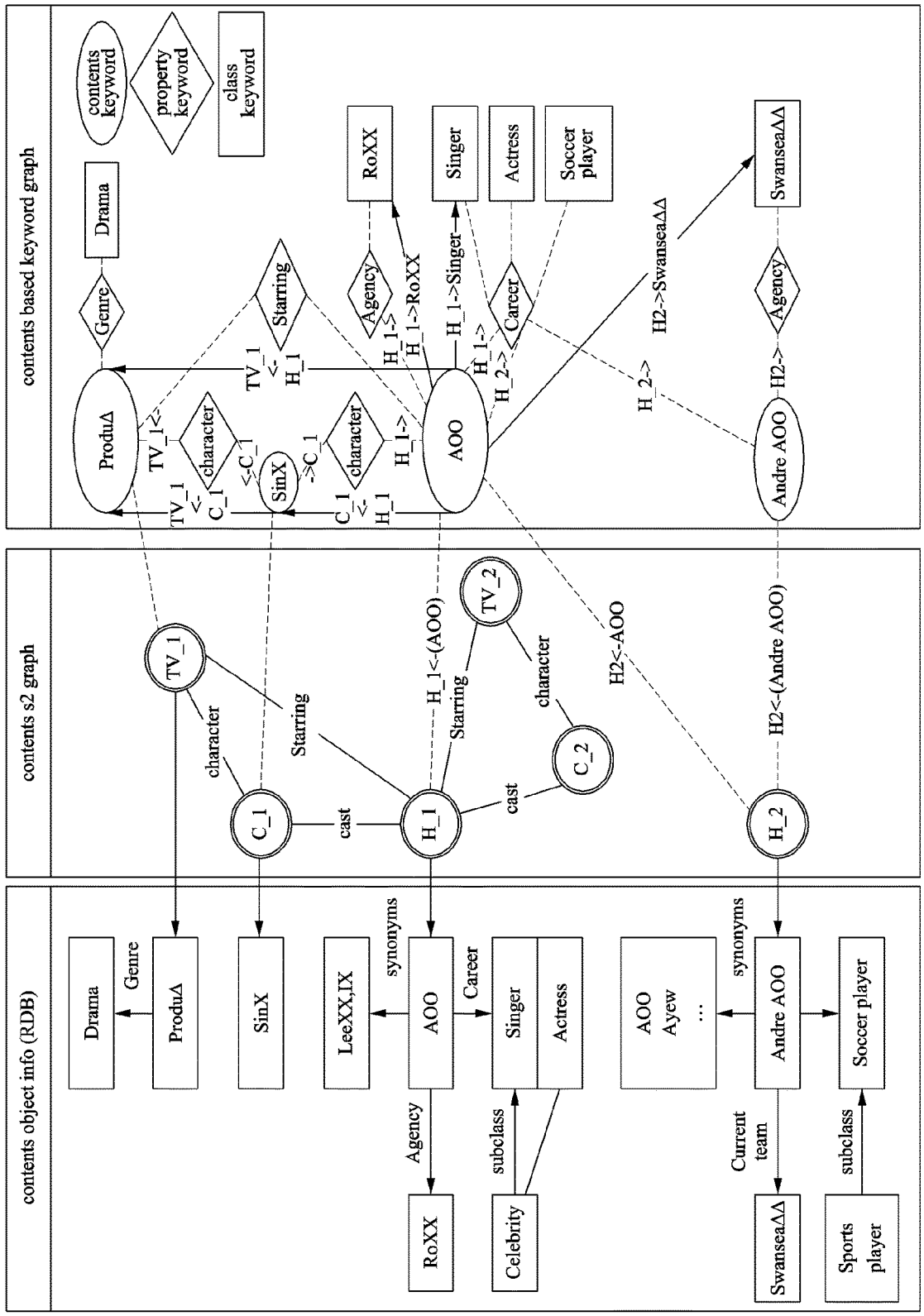
FIG. 11 is a diagram illustrating a keyword graph system according to an example embodiment.

5. Generate a primary keyword graph based on a content graph
    A. Generate a keyword relation from a relation (subject, relation, object)
        i. ex) (AOO, song, Zeze)→(AOO, song), (AOO, Zeze)
    B. A reference link to a content graph exists in the keyword relation, and thus may access to the corresponding content inversely by referring to the content graph
6. Merge extracted extend keyword data and a primary keyword graph
    A. When merging, assign a connecting strength between nodes
        i. Assign the connecting strength basically based on the extracted extend keyword
        ii. May assign the connecting strength through a separate query log, click clog analysis
7. Use the merged keyword graph
    A. Similar to a scheme using extend keyword data
    B. Assume an input query as an object, and refer to the graph C. Obtain information on all nodes connected directly to a predetermined matching node
   i. ex) "AOO"→"drama, cast, lover, song, airport photo, medium short hair", etc.
D. The keyword graph additionally includes a reference link to a content graph, and thus may provide a variety of content using the keyword graph FIG. 11 is a diagram illustrating a keyword graph system according to an example embodiment. The keyword graph system may generate a keyword graph based on a content graph, as described through FIGS. 10A and 10B.

A left image of FIG. 11 illustrates a content DB. The content DB is a system configured to store structured content such as people, broadcasts, and movies. A middle image of FIG. 11 illustrates a content graph. The content graph is a graph system including a vertex and a relation based on the content DB. The vertex corresponds to an object. A right image of FIG. 11 illustrates a keyword graph. The keyword graph is a system configured by converting the vertex and the relation of the content graph into keywords, and is utilized by the extend keyword system.

Figure 12:
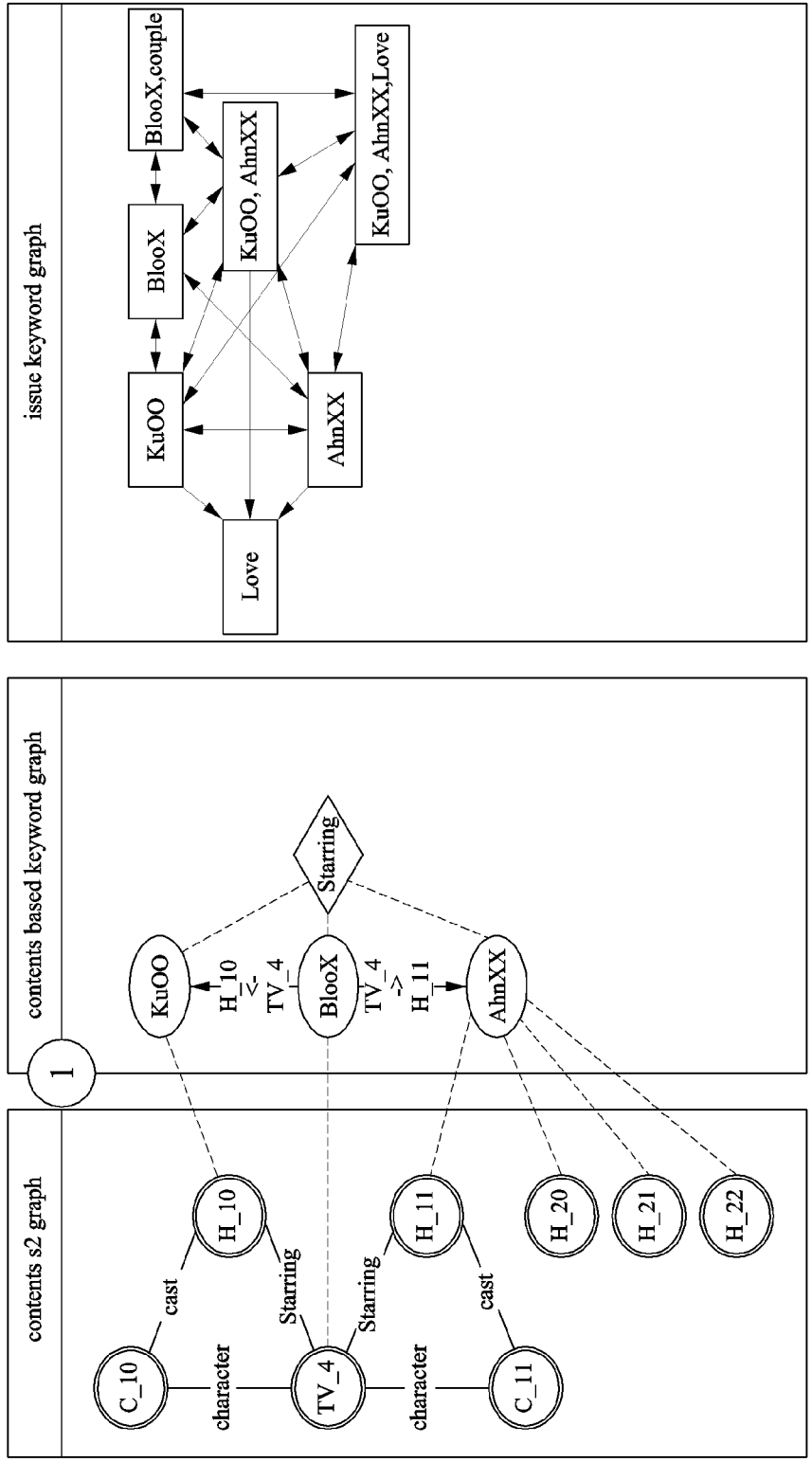
FIGS. 12 through 14 are diagrams illustrating examples of utilizing a keyword graph according to an example embodiment.
Figure 13:
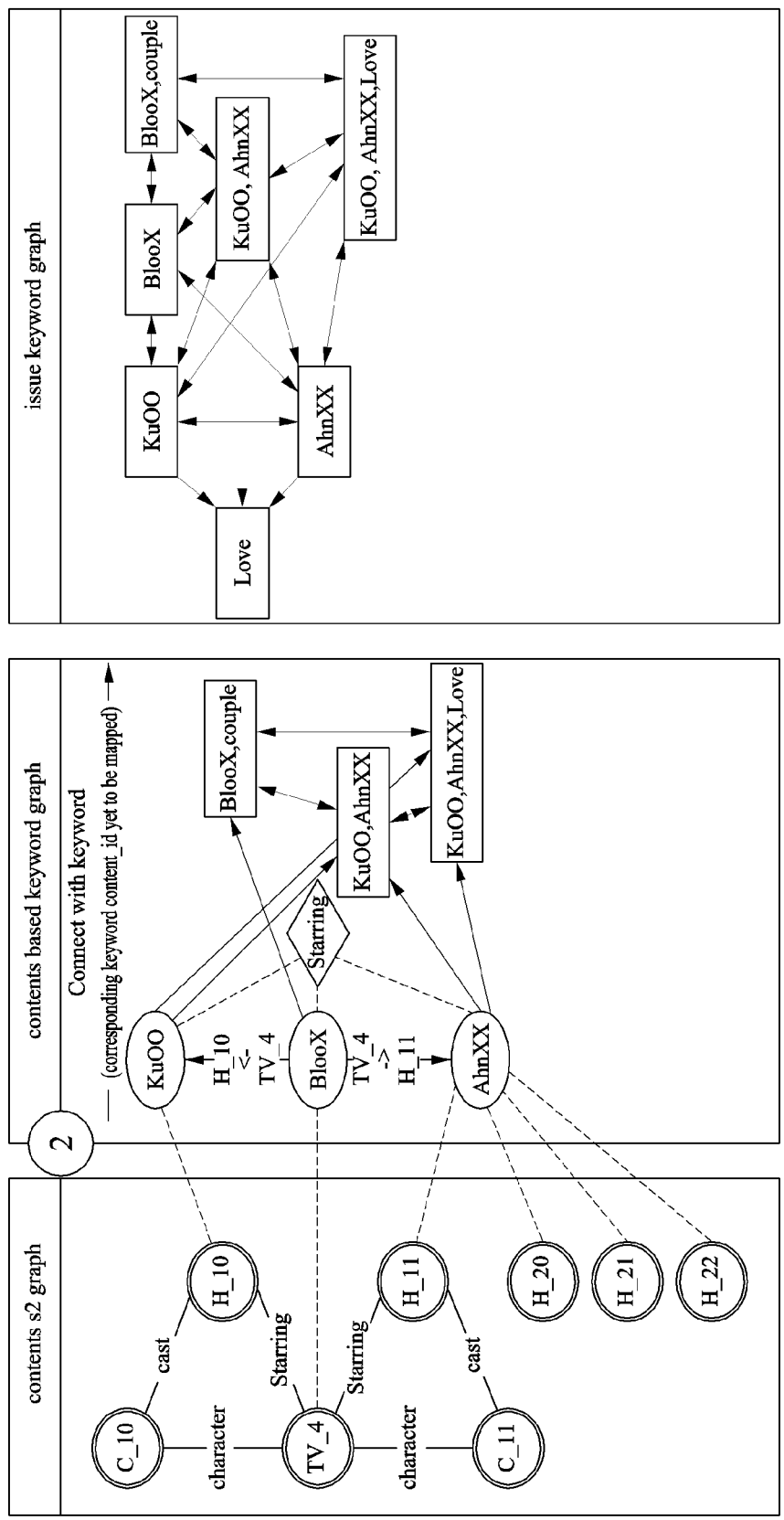
Figure 14:
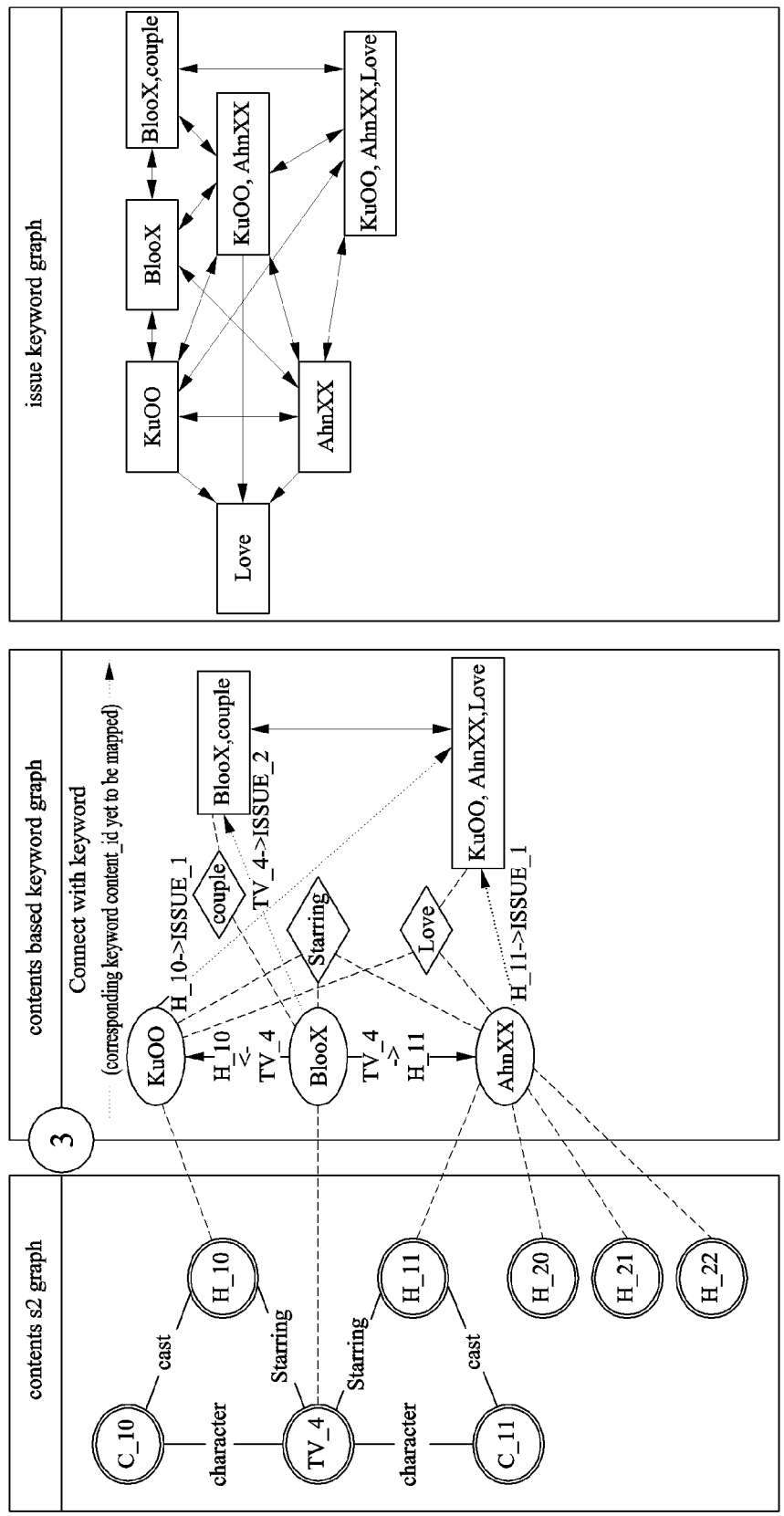

Terms used in FIG. 11 may be defined as follows.
1. contents_keyword
   A. a keyword corresponding to a name of an object (vertex) to which contents id is issued
2. property_keyword
   A. a relation (edge) keyword between objects
   B. a relation keyword of object—class_keyword (an edge is absent on the content graph)
3. class_keyword
   A. a keyword for which an object is yet to be classified
      i. ex) RoXXX (company classification), OO University (academy classification)
   B. a conceptual keyword difficult to classify
      i. ex) university, drama, celebrity FIGS. 12 through 14 are diagrams illustrating examples of utilizing a keyword graph according to an example embodiment. FIG. 12 is an example of a first operation. In an issue keyword graph, keywords such as "blooX couple" and "KuOO AhnXX love" may be generated. However, in a content keyword graph, "KuOO" and "AhnXX" have a relation of only "starring" with respect to the work "blooX".

FIG. 13 is an example of a second operation. Two new keywords, for example, "KuOO AhnXX love" and "blooX couple", may be added to the content keyword graph, and connected to the existing keywords. In the second operation, the keywords may not be connected to content yet.

FIG. 14 is an example of a third operation. Two relations, for example, "couple" and "love", may be added to the two new keywords, and finally connected to the content. For example, "KuOO" and "AhnXX" may be connected to the keyword "blooX couple".

Figure 15:
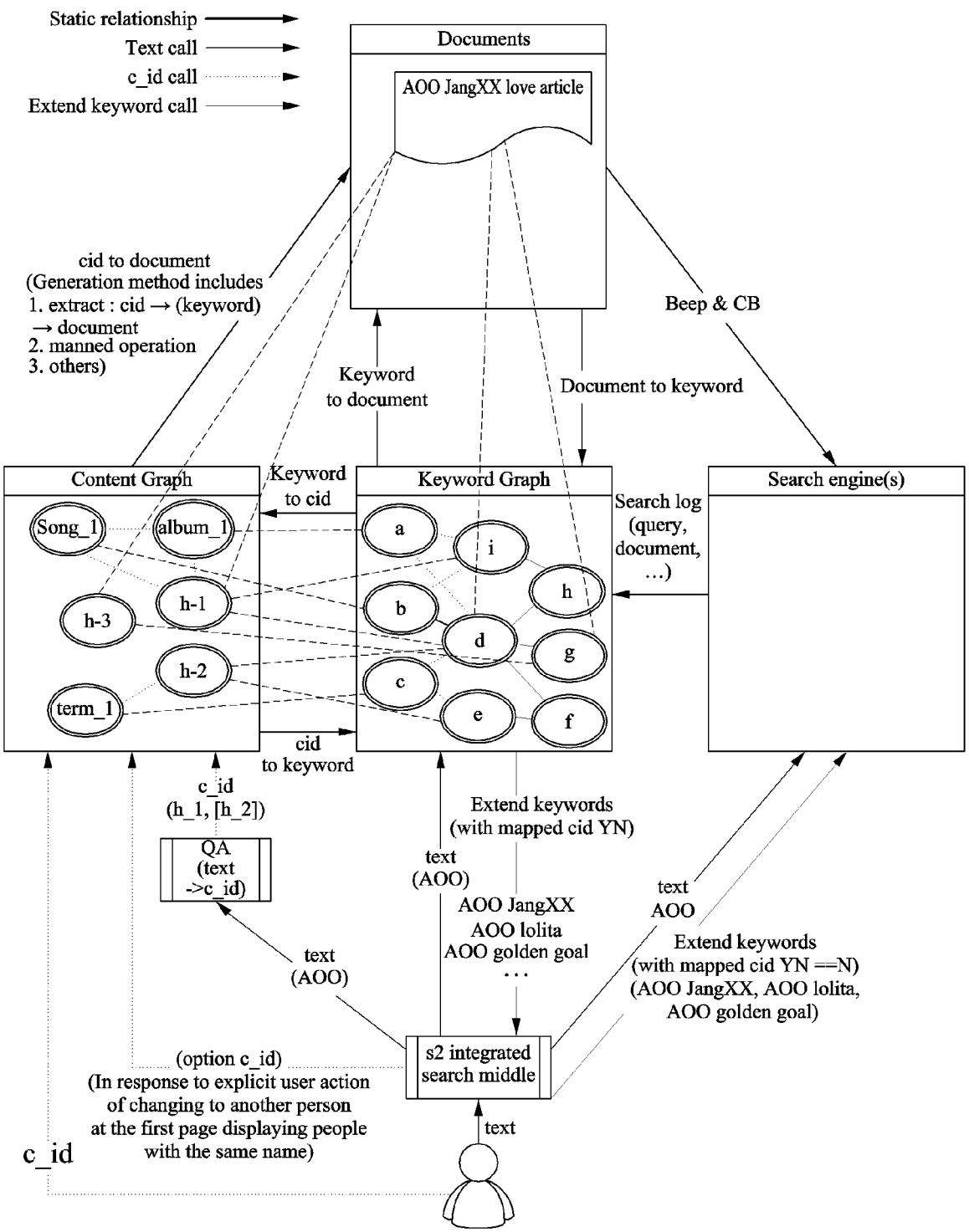
FIG. 15 is a diagram illustrating a system structure of a search service according to an example embodiment.

FIG. 15 is a diagram illustrating a system structure of a search service according to an example embodiment. Components shown in FIG. 15 may operate as described in Table 5.

TABLE 5

Content Graph: Subject related content card system (input: query, output: subject related card result)
ex) person, broadcast, etc.
Keyword Graph: Extend keyword system (input: query, output: extend query)
Search engine: Search ranking system (input: extend query, output: search result card)

TABLE 5-continued

Documents: all data being target of search
ex) news, images, videos, blogs, cafes, etc.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A search method, comprising:
receiving a search query;
setting the search query as an object;
generating a plurality of extended queries by adding at least one property related to the object to the object;
determining rankings of the plurality of extended queries;
providing a plurality of search results for each of the extended queries based on the rankings of the extended queries;
receiving a selection of a search result of the plurality of search results;
setting the selected search result as a next object; and
repeating the generating, determining, and providing steps for the next object to provide a plurality of next search results corresponding to the next object,
wherein the plurality of next search results is not limited to a search result related to the object,
wherein the providing of the plurality of search results comprises:
in case that there exists a same search result, from among the search results for the at least one extended query, as a search result by another extended query having a higher ranking than a ranking of the at least one extended query, removing the corresponding search result from the search results for the at least one extended query;
identifying a template of a card to display each of the search results for the at least one extended query based on a category of a content corresponding to each of the search results for the at least one extended query; and
providing each of the search results for the at least one extended query in a form of the card corresponding to the identified template,
wherein the generating of the plurality of extended queries comprises:
obtaining at least one extended query corresponding to the object from an object-property list in which extended keywords generated by combining the object with the at least one property are listed in order of the rankings, and wherein the object-property list is generated by extracting object candidates from at least one of a query log and a click log, based on the suffix patterns following the object candidates.

2. The search method of claim 1, wherein the generating of the plurality of extended queries comprises:
obtaining frequencies of properties corresponding to the object from at least one of the query log and the click log;
arranging extended query candidates corresponding to the properties in order of the rankings by assigning weights corresponding to predefined periods to the frequencies; and
generating the plurality of extended queries from the arranged extended query candidates.

3. The search method of claim 2, wherein the arranging comprises assigning a penalty to at least one of the properties based on rankings of the frequencies of the properties in one of the periods.

4. The search method of claim 2, wherein the arranging comprises:
extracting a keyword related to the object based on at least one of a real-time popular search word and real-time news information related to the object; and
assigning a weight to a property that matches the extracted keyword.

5. The search method of claim 2, wherein the generating of the plurality of extended queries further comprises:
generating at least one second extended query using at least one of a suggest function and a related keyword function; and
arranging the at least one second extended query at a lower ranking than the extended query candidates corresponding to the properties.

6. The search method of claim 1, wherein the generating of the plurality of extended queries comprises generating the plurality of extended queries using at least one of a suggest function and a related keyword function when a property corresponding to the object is absent.

7. The search method of claim 1, further comprising:
arranging the plurality of extended queries in a vertical scroll direction and outputting the plurality of extended queries in order of the rankings; and
arranging and outputting a search result for each of the plurality of extended queries in a horizontal scroll direction with respect to the corresponding extended query.

8. The search method of claim 1, further comprising:
in response to sharing of the cards using an application, visualizing the cards to be identical to the template and sharing the cards with a counterpart of the sharing.

9. The search method of claim 1, wherein the generating of the plurality of extended queries comprises:
determining one of categories of properties corresponding to the object based on a search history of a user; and
generating at least one extended query belonging to the determined category.

10. The search method of claim 1, wherein the generating of the plurality of search result comprises:
classifying the search results including the plurality of extended queries as search words in a unit of collection which is a criterion for classifying content; and
generating at least one search result classified in the unit of collection,
wherein the collection comprises at least one of news, an image, an integrated web, and a video.

11. The search method of claim 1, wherein the object-property list is generated further
by separating an object and properties by applying at least one of a morpheme analyzing scheme and a pattern matching scheme to the object candidates;
by generating extended keywords based on the separated object and the separated properties; and
by arranging the generated extended keywords by assigning weights to frequencies of the separated properties obtained from the query log.

12. A method of providing a search user interface (UI), the method comprising:
- transmitting a search query input by a user to a server;
- receiving, from the server, a plurality of extended queries generated based on the search query input and a plurality of search results including each of the extended queries as a search word, wherein the search query is set as an object, and the extended queries are generated by adding at least one property related to the object to the object;
- providing a UI displaying at least one search result of the plurality of search results for each of the extended queries based on ranks of the extended queries;
- receiving a selection of a result of the at least one search result;
- setting the selected search result as a next object and a next search query;
- repeating the transmitting, receiving of the plurality of extended queries, and providing steps for the next object to provide a plurality of next search results corresponding to the next object,
- wherein the plurality of next search results is not limited to a search result related to the object,
- wherein the receiving of the plurality of search results comprises:
  - in case that there exists a same search result, from among the search results for the at least one extended query, as a search result by another extended query having a higher rank than a rank of the at least one extended query, removing the corresponding search result from the search results for the at least one extended query;
  - identifying a template of a card to display each of the search results for the at least one extended query based on a category of a content corresponding to each of the search results for the at least one extended query; and
  - providing each of the search results for the at least one extended query in a form of the card corresponding to the identified template,
- wherein the generating of the plurality of extended queries comprises:
  - obtaining at least one extended query corresponding to the object from an object-property list in which extended keywords generated by combining the object with the at least one property are listed in order of the ranks, and
- wherein the object-property list is generated by extracting object candidates from at least one of a query log and a click log, based on the suffix patterns following the object candidates.

13. The method of claim 12, further comprising:
transmitting, to the server, sharing of the at least one card input from the user,
wherein the at least one card is visualized by the server to be identical to the template and shared with a counterpart of the sharing.

14. The method of claim 12, further comprising:
providing a UI arranging at least one extended query in a vertical scroll direction and displaying the at least one extended query in order of the rankings; and
providing a UI arranging and displaying a search result for each of the at least one extended query in a horizontal scroll direction with respect to the corresponding extended query.

15. A search apparatus, comprising:
a processor configured to receive a search query, set the search query as an object, generate a plurality of extended queries by adding at least one property related to the object to the object, generate a plurality of search result including each of the extended queries as a search word, provide the search results for each of the extended queries based on ranks of the extended queries, receive a selection of a search result of the plurality of search results, set the selected starch result as a next object, and repeat the generating of the plurality of extended queries generating the plurality of search result, and providing steps for the next object to provide a plurality of next search results corresponding to the next object,
wherein the processor provides the plurality of search results by:
- in case that there exists same search result, from among the search results for the at least one extended query, as a search result by another extended query having a higher rank than a rank of the at least one extended query, removing the corresponding search result from the search results for the at least one extended query;
- identifying a template of a card to display each of the search results for the at least one extended query based on a category of a content corresponding to each of the search results for the at least one extended query; and
- providing each of the search results for the at least one extended query in a form of the card corresponding to the identified template,
wherein the generating of the plurality of extended queries comprises:
- obtaining at least one extended query corresponding to the object from an object-property list in which extended keywords generated by combining the object with the at least one property are listed in order of the rankings, and
wherein the object-property list is generated by extracting object candidates from at least one of a query log and a click log, based on the suffix patterns following the object candidates.

16. The search apparatus of claim 15, further comprising:
a memory configured to store an object-property list in which extended keywords generated by combining the object with the at least one property are listed in order of the rankings, and a keyword graph which is a topology that defines relations between keywords based on connecting strengths,
wherein the processor is configured to obtain at least one extended query corresponding to the object from the object-property list and the keyword graph.

* * * * *